United States Patent
Yu

(10) Patent No.: US 10,043,302 B2
(45) Date of Patent: Aug. 7, 2018

(54) METHOD AND APPARATUS FOR REALIZING BOOT ANIMATION OF VIRTUAL REALITY SYSTEM

(71) Applicant: Beijing Pico Technology Co., Ltd., Beijing (CN)

(72) Inventor: Yating Yu, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 0 days.

(21) Appl. No.: 15/296,949

(22) Filed: Oct. 18, 2016

(65) Prior Publication Data
US 2017/0301123 A1 Oct. 19, 2017

(30) Foreign Application Priority Data

Apr. 18, 2016 (CN) .......................... 2016 1 0243826
Apr. 18, 2016 (CN) .......................... 2016 1 0244316

(51) Int. Cl.
*G06T 13/20* (2011.01)
*G06T 13/80* (2011.01)
*G06T 11/60* (2006.01)

(52) U.S. Cl.
CPC .............. *G06T 13/20* (2013.01); *G06T 11/60* (2013.01); *G06T 13/80* (2013.01); *G06T 2213/08* (2013.01)

(58) Field of Classification Search
CPC ......... G06T 13/20; G06T 13/80; G06T 11/60; G06T 2213/08
See application file for complete search history.

(56) References Cited

U.S. PATENT DOCUMENTS

2013/0336631 A1* 12/2013 Kura .................. G02B 27/0172
386/230
2018/0018806 A1 1/2018 Li

FOREIGN PATENT DOCUMENTS

CN 101266546 A 9/2008
CN 104035760 A 9/2014
(Continued)

OTHER PUBLICATIONS

PhoneArena ("How to install a custom Android boot animation", https://www.phonearena.com/news/How-to-install-a-custom-Android-boot-animation_id53609, (Mar. 7, 2014) and archived as of Mar. 10, 2014 at archive.org (Year: 2014).*
(Continued)

*Primary Examiner* — William A Beutel
(74) *Attorney, Agent, or Firm* — Arch & Lake LLP

(57) ABSTRACT

The method disclosed by the present disclosure comprises: acquiring cyclic sequential frames of a boot animation, wherein the boot animation includes a planar boot animation and a stereo boot animation; processing the cyclic sequential frames into sequential frames of left-right double screen effect; performing screen shots for the sequential frames of left-right double screen effect; replacing the original boot animation in the virtual reality system with screenshots, so as to realize the boot animation of the virtual reality system. By processing the acquired cyclic sequential frames of the boot animation into sequential frames of left-right double screen effect, performing a screenshot thereof, and replacing the original boot animation in the virtual reality system, it solves the problem that a planar animation file or a stereo animation file produced by animation production software cannot be directly imported into the virtual reality system for a usage, and enables the user to experience more excellent planar animation effect or 3D stereo dynamic effect.

8 Claims, 2 Drawing Sheets

(56) References Cited

FOREIGN PATENT DOCUMENTS

| | | | |
|---|---|---|---|
| CN | 104102545 | A | 10/2014 |
| CN | 105447898 | A | 3/2016 |
| CN | 106792093 | A | 5/2017 |

OTHER PUBLICATIONS

GifCam (http://blog.bahraniapps.com/gifcam/ published as of Oct. 10, 2014 and archived as of Oct. 29, 2014 at www.archive.org) (Year: 2014).*

Giphy ("Bugs Oculus Gif" published at Giphy, https://giphy.com/gifs/oculus-rift-ue4-EuKL9xllHAxgl as of Oct. 1, 2014) (Year: 2014).*

Wikipedia ("Graphics Interchange Format", Wikipedia, published at https://en.wikipedia.org/wiki/GIF as of Jul. 10, 2014, archived at www.archive.org) (Year: 2014).*

First Office Action issued in corresponding Chinese Application No. 201610243826.X dated Apr. 4, 2018, 8 pages.

\* cited by examiner

METHOD AND APPARATUS FOR REALIZING BOOT ANIMATION OF VIRTUAL REALITY SYSTEM

CROSS-REFERENCE TO RELATED APPLICATIONS

This application claims the benefit and priority of Chinese Patent Application No. 201610243826.X filed Apr. 18, 2016 and Chinese Patent Application No. 201610244316.4 filed Apr. 18, 2016. The entire contents of the above applications are incorporated herein by reference.

TECHNICAL FIELD

The present disclosure relates to the technical field of virtual reality, and particularly, to a method and an apparatus for realizing a boot animation of a virtual reality system.

BACKGROUND

At present, the boot animation effect of the virtual reality system mainly includes stereo effect and planar effect. As compared with planar effect, stereo effect is more magnificent and shocking. But virtual reality technology currently is still a new field, and is inevitably limited by hardware technology. For example, in virtual reality experiences, there is no good solution for anti-vertigo technology currently, and the user's higher requirement cannot be satisfied. When a virtual reality system is activated, although a boot animation of stereo effect brings excitements, an effect of transition from a realistic environment to a virtual environment is absent, which brings much discomfort to the user. Thus it is necessary to reserve traditional planar boot animation effects in the VR mode for a transition, and that can achieve some visual interaction effects that are unrealizable by stereo animations. For example, the boot animation in a style of shadow puppet, paper cutting, etc. cannot be replaced by stereo effects. However, planar animation files produced by 2D animation production software cannot be directly imported into the virtual reality system for a usage, and thus the required planar boot animation effect cannot be achieved.

In addition, although there are many manners for realizing a boot animation of stereo effect in the virtual reality system, usually that is realized through a software platform, but the software platform may not support the dynamic effect resources provided by all similar software, or directly import the produced stereo animation file into the virtual reality system for a usage, and thus many dynamic effects unrealizable have to be discarded, which is very regrettable.

SUMMARY OF THE DISCLOSURE

The present disclosure provides a method and an apparatus for realizing a boot animation of a virtual reality system, in order to apply the planar animation effect produced by a software platform into the virtual reality system based on the existing hardware device, or in order to solve the problem that one software platform cannot support the dynamic effect resources provided by all similar software, or directly import the produced stereo animation file into the virtual reality system for a usage.

According to one aspect of the present disclosure, the present disclosure provides a method for realizing a boot animation of a virtual reality system, comprising:

acquiring cyclic sequential frames of a boot animation, wherein the boot animation includes a planar boot animation and a stereo boot animation;

processing the cyclic sequential frames into sequential frames of left-right double screen effect;

performing screen shots for the sequential frames of left-right double screen effect on a per frame basis; and replacing the original boot animation in the virtual reality system with the screenshots of the frames of image, so as to realize the boot animation of the virtual reality system.

Wherein, before the replacing the original boot animation in the virtual reality system with the screenshots of the frames of image, the method further comprises: optimizing the screenshot of each frame of image and compressing a volume of the screenshot, while ensuring a predetermined visual effect.

Wherein, the acquiring cyclic sequential frames of a boot animation specifically comprises:

producing a planar boot animation video for the planar boot animation using 2D animation production software and image synthesis software, and rendering dynamic images with the cyclic sequential frames; and producing a stereo boot animation video for the stereo boot animation using 3D animation production software and image synthesis software, and rendering dynamic images with the cyclic sequential frames.

Wherein, the performing screen shots for the sequential frames of left-right double screen effect on a per frame basis specifically comprises:

saving the sequential frames of left-right double screen effect into a file;

installing the file to a handheld device or a PC end; and sending a screenshot command to the handheld device or the PC end so that the file is played thereby, and performing screen shots for the sequential frames of left-right double screen effect in the file on a per frame basis.

Wherein, the virtual reality system adopts an Android operating system.

According to another aspect of the present disclosure, the present disclosure provides an apparatus for realizing a boot animation of a virtual reality system, comprising:

a sequential frame acquiring module configured to acquire cyclic sequential frames of a boot animation, wherein the boot animation includes a planar boot animation and a stereo boot animation;

a double-screen processing module configured to process the cyclic sequential frames into sequential frames of left-right double screen effect;

a screen shooting module configured to perform screen shots for the sequential frames of left-right double screen effect on a per frame basis; and a replacing module configured to replace the original boot animation in the virtual reality system with the screenshots of the frames of image, so as to realize the boot animation of the virtual reality system.

Wherein, the apparatus further comprises an optimizing module;

wherein before the replacing module replaces the original boot animation in the virtual reality system with the screenshots of the frames of image, the optimizing module is configured to optimize the screenshot of each frame of image and compress a volume of the screenshot, while ensuring a predetermined visual effect.

Wherein, the sequential frame acquiring module is specifically configured to produce a planar boot animation video for the planar boot animation using 2D animation production software and image synthesis software, and render dynamic images with the cyclic sequential frames; and produce a stereo boot animation video for the stereo boot animation using 3D animation production software and image synthesis software, and render dynamic images with the cyclic sequential frames.

Wherein, the double-screen processing module is specifically configured to:

save the sequential frames of left-right double screen effect into a file; install the file to a handheld device or a PC end; and send a screenshot command to the handheld device or the PC end so that the file is played thereby, and perform a screen shot for the sequential frames of left-right double screen effect in the file on a per frame basis.

Wherein, the virtual reality system adopts an Android operating system.

The embodiments of the present disclosure have the following beneficial effects: by processing the acquired cyclic sequential frames of the boot animation into sequential frames of left-right double screen effect, performing a screenshot thereof on a per frame basis, and replacing the original boot animation in the virtual reality system, in case of the planar boot animation, it solves the problem that a planar animation file produced through 2D animation production software cannot be directly imported into the virtual reality system for a usage and the required planar boot animation effect cannot be achieved, and enables the user to experience the planar animation effect, thus during the experience of the virtual reality product, not only the user's restless mood when waiting for the system booting can be calmed, but also the brain and the eyeballs are provided with an adaptive process under the virtual environment; and in case of the stereo boot animation, it avoids the predicament that many dynamic effects unrealizable due to the limitations of the software platform resources have to be discarded, and the technical processing is quicker without influencing the realization of dynamic effect, which solves the problem that one software platform cannot support the dynamic effect resources provided by all similar software, or directly import the produced stereo animation file into the virtual reality system for a usage, and enables the user to experience a more excellent 3D stereo dynamic effect.

In a further preferred embodiment, before being imported into the virtual reality system, the screenshots of the sequential frames are optimized, thereby saving the resource space of the virtual reality system.

DETAILED DESCRIPTION

In order that the objectives, technical solutions and advantages of the present disclosure are clearer, the embodiments of the present disclosure will be further described in details as follows with reference to the drawings.

Figure 1:
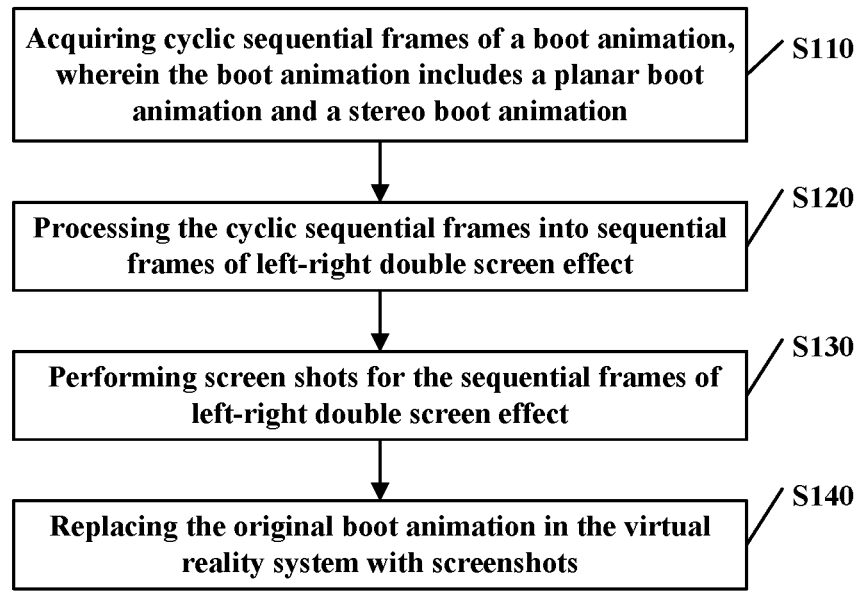
FIG. 1 is a flow diagram of a method for realizing a boot animation of a virtual reality system provided by an embodiment of the present disclosure.

FIG. 1 is a flow diagram of a method for realizing a boot animation of a virtual reality system provided by an embodiment of the present disclosure. As shown in FIG. 1, a method for realizing a boot animation of a virtual reality system provided by an embodiment of the present disclosure comprises:

step S110: acquiring cyclic sequential frames of a boot animation, wherein the boot animation includes a planar boot animation and a stereo boot animation. Since the boot animation of the system is in a loop playback during a system booting until the system booting is completed, it is unnecessary to acquire each frame of image in the booting process, and it is only needed to acquire each frame of image in one cycle of the boot animation.

step S120: processing the cyclic sequential frames into sequential frames of left-right double screen effect.

As to the planar boot animation, in the currently common virtual reality system, the two eyes of a user see images displayed on the left half and the right half of a display, respectively. Thus each frame of image acquired in step S110 shall be processed into images of left-right double screen effect through relevant software, so that both eyes of the user can see each frame of image. The planar animation does not need to make the user experience the stereo impression, and thus the left half and the right half of each frame of image may be completely the same as each other.

As to the stereo boot animation, when a person looks around, the images acquired are slightly different from each other because the two eyes are at different positions, and an entire scene of the world around is formed after those images are fused in the brain. In the currently common virtual reality system, a stereo impression is produced by causing the two eyes of a user to see images displayed on the left half and the right half of a display, respectively. Thus each frame of image acquired in step S110 shall be processed into images of left-right double screen effect. By adjusting the visual angle and distance between the human eye and the image, the images seen by the left and right eyes of the user are slightly different from each other, and they are fused in the brain so that the user feels the stereo effect. This step may adopt relevant software to process the cyclic sequential frames into sequential frames of left-right double screen effect, such as Unity3D.

step S130: performing screen shots for the sequential frames of left-right double screen effect on a per frame basis. The sequential frames of left-right double screen effect processed in step S120 are saved in a file, but the file usually cannot be directly played by the current virtual reality device, and thus the screenshot of each frame of image of the sequential frames of left-right double screen effect in the file shall be acquired through a screen shot.

step S140: replacing the original boot animation in the virtual reality system with the screenshots of the frames of image. The sequential frames of the original boot animation in the virtual reality system are replaced by the screenshot of each frame of image acquired in step S130. During a system booting, the screenshot of each frame of image is in a loop playback, so as to realize the boot animation of the virtual reality system. Preferably, the virtual reality system adopts the Android operating system, which is a free operating system based on a Linux system with open source codes, and which is widely applied to mobile devices, such as smartphone and tablet computer.

Preferably, before step S140, the method for realizing a boot animation of a virtual reality system provided by a preferred embodiment of the present disclosure further comprises: optimizing the screenshot of each frame of image and compressing a volume of the screenshot, while ensuring a predetermined visual effect. The plural frames of screenshots acquired in step S130 may have a large volume, and a lot of spatial resources will be occupied when those screenshots are directly imported into the virtual reality system. In addition, more memory resources and processing resources will be consumed when the system opens those pictures. Thus on the premise that the predetermined visual effect is achieved, those screenshot may be optimized, such as compressing the volume of the pictures, converting the storage format of the pictures, etc., thereby saving the resources of the virtual reality system.

Preferably, the "acquiring cyclic sequential frames of a boot animation" in step S110 specifically comprises:

producing a planar boot animation video for the planar boot animation using 2D animation production software such as Flash and image synthesis software, and rendering dynamic images with the cyclic sequential frames; and producing a stereo boot animation video for the stereo boot animation using 3D animation production software and image synthesis software, and rendering dynamic images with the cyclic sequential frames. 3D animation software and image synthesis software are mainstream tools for producing an animation effect at present, such as Maya, 3Dmax, etc., and the 3D animations produced through those software can present a good stereo space sense.

Preferably, the "performing screen shots for the sequential frames of left-right double screen effect" in step S130 specifically comprises:

saving the sequential frames of left-right double screen effect into a file. For the planar boot animation, the sequential frames of left-right double screen effect processed by relevant software will be saved into a file of a certain format; and for the stereo boot animation, the sequential frames of left-right double screen effect processed by relevant software such as Unity3D will also be saved into a file of a certain format.

The file is installed to a handheld device or a PC end. Since the virtual reality system cannot directly play the file, the file needs to be installed to a device capable of playing it, such as a PC end or a handheld device like cellular phone, so that the file can be played thereby.

A screenshot command is sent to the handheld device or the PC end so that the file is played by the handheld device or the PC end, and a screen shot is performed for the sequential frames of left-right double screen effect on a per frame basis. During playing of the file, the screen shot is performed at a fixed time interval, such as 120 times of screen shots per second, so as to obtain the screenshot of each frame of image of the sequential frames of left-right double screen effect. The virtual reality system can open those screenshots although it cannot open the file.

Figure 2:
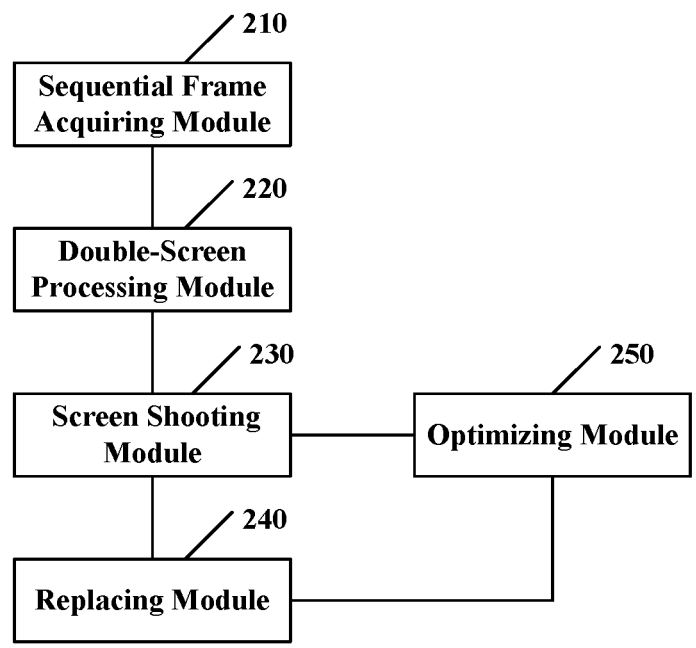
FIG. 2 is a structural diagram of an apparatus for realizing a boot animation of a virtual reality system provided by an embodiment of the present disclosure.
Figure 3:
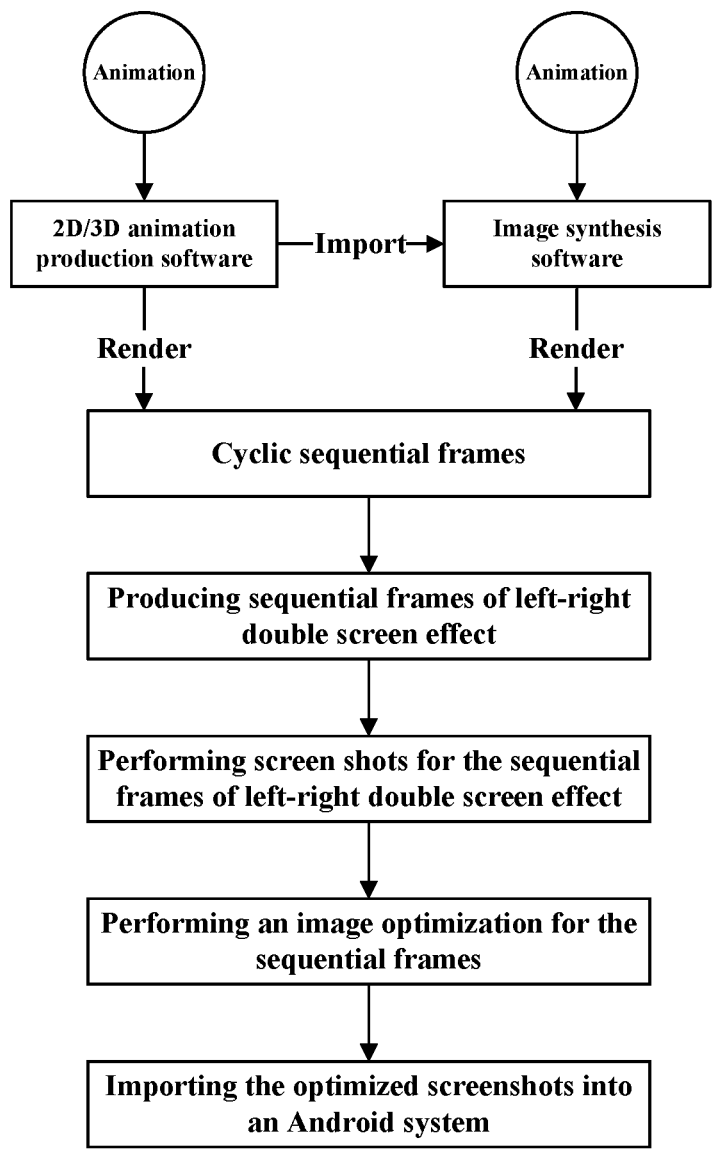
FIG. 3 is a work flow diagram of an apparatus for realizing a boot animation of a virtual reality system provided by an embodiment of the present disclosure.

FIG. 2 is a structural diagram of an apparatus for realizing a boot animation of a virtual reality system provided by an embodiment of the present disclosure. As shown in FIG. 2, an apparatus for realizing a boot animation of a virtual reality system provided by an embodiment of the present disclosure comprises a sequential frame acquiring module 210, a double-screen processing module 220, a screen shooting module 230 and a replacing module 240. FIG. 3 is a work flow diagram of an apparatus for realizing a boot animation of a virtual reality system provided by an embodiment of the present disclosure.

As shown in FIGS. 2 and 3, firstly, the sequential frame acquiring module 210 acquires cyclic sequential frames of a boot animation, wherein the boot animation includes a planar boot animation and a stereo boot animation. Preferably, the sequential frame acquiring module 210 produces a planar boot animation video for the planar boot animation using 2D animation production software such as Flash and image synthesis software, and renders dynamic images with the cyclic sequential frames; and produces a stereo boot animation video for the stereo boot animation using 3D animation production software and image synthesis software, and renders dynamic images with the cyclic sequential frames; for example Maya, 3Dmax, etc., may be used. The 3D animations produced through those software can present a good stereo space sense.

The double-screen processing module 220 processes the cyclic sequential frames into sequential frames of left-right double screen effect. As to the planar boot animation, each frame of image acquired by the sequential frame acquiring module 210 is processed into images of left-right double screen format through relevant software, so that the left and right eyes of the user can see each frame of image of the planar boot animation. As to the stereo boot animation, each frame of image acquired by the sequential frame acquiring module 210 is processed into images of left-right double screen format which are slightly different from each other through relevant software such as Unity3D, and thus the images seen by the left and right eyes of the user are slightly different from each other, and they are fused in the brain so that the user feels the stereo effect.

The screen shooting module 230 performs screen shots for the sequential frames of left-right double screen effect processed by the double-screen processing module 220 on a per frame basis. The images processed by the double-screen processing module 220 are saved into a file of a certain format, but the file cannot be directly opened by the virtual reality system, and thus the screenshot of each frame of image in the file shall be acquired. Preferably, the double-screen processing module 230 installs the file saving the sequential frames of left-right double screen effect to a handheld device or a PC end, then sends a screenshot command to the handheld device or the PC end so that the file is played by the handheld device or the PC end, and performs a screen shot for the sequential frames of left-right double screen effect in the file on a per frame basis. Those screenshots can be directly opened by the virtual reality system.

The replacing module 240 replaces the original boot animation in the virtual reality system with the screenshot of each frame of image acquired by the screen shooting module 230. During a system booting, the screenshot of each frame of image is in a loop playback, so as to realize the boot animation of the virtual reality system. Preferably, the virtual reality system adopts the Android operating system.

In a preferred embodiment of the present disclosure, the apparatus for realizing a stereo boot animation of a virtual reality system further comprises an optimizing module 250. Before the replacing module 240 replaces the original boot animation in the virtual reality system with the screenshots, the optimizing module 250 optimizes the screenshot of each frame of image while ensuring a predetermined visual effect, and saves the resource space of the virtual reality system by means of compressing the volume of the screenshot of each frame of image or changing the storage format.

In conclusion, as compared with the prior art, a method and an apparatus for realizing a boot animation of a virtual reality system provided by the present disclosure has the following beneficial effects:

The planar animation file produced through 2D animation production software cannot be directly imported into the virtual reality system for a usage, and the required planar boot animation effect cannot be achieved. Thus based on the existing hardware device, the method and the apparatus for realizing a boot animation of a virtual reality system provided by the present disclosure realizes the planar animation effect in the virtual reality system using a reasonable technical method. Thus during the experience, not only the user's restless mood when waiting for the program starting can be calmed, but also the brain and the eyeballs are provided with an adaptive process under the virtual environment, so that the user experiences the images of excellent planar dynamic effect.

One software platform may not support the animation effect resources provided by other similar software, and cannot satisfy all the animation effects. Thus the method and the apparatus for realizing a boot animation of a virtual reality system provided by the present disclosure uses a reasonable technical method in conjunction with the characteristics of relevant software tools, and combines those tools with the stereo imaging platform of the virtual reality system to realize a solution not influencing the effect while being more quickly carried out, which avoids the predicament that many dynamic effects cannot be realized due to the limitations of the software platform resources, and enables the user to experience the images of more excellent 3D stereo dynamic effect.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The apparatus for realizing a boot animation of a virtual reality system of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the apparatus for realizing a boot animation of a virtual reality system executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

What is claimed is:

1. A method for realizing a boot animation of a virtual reality system, comprising:
   acquiring cyclic sequential frames of a boot animation from the virtual reality system, wherein the boot animation includes a planar boot animation and a stereo boot animation;
   processing the cyclic sequential frames into sequential frames of left-right double screen effect for displaying a planar boot animation video and a stereo boot animation video on a display;
   saving sequential frames of left-right double screen effect in the planar boot animation and the stereo boot animation respectively to a first file and a second file;
   performing screenshots for the sequential frames of left-right double screen effect on a per frame basis while playing the first file and the second file to obtain the screenshot of each frame of image of the sequential frames of left-right double screen effect; and
   replacing an original boot animation in the virtual reality system with the screenshots of the frames of image as a current boot animation, so as to realize the boot animation of the virtual reality system.

2. The method for realizing a boot animation of a virtual reality system according to claim 1, wherein before replacing the original boot animation in the virtual reality system with the screenshots of the frames of image, the method further comprises: optimizing the screenshot of each frame of image and compressing a volume of the screenshot, while ensuring a predetermined visual effect.

3. The method for realizing a boot animation of a virtual reality system according to claim 2, wherein the acquiring cyclic sequential frames of a boot animation specifically comprises:
   producing a planar boot animation video for the planar boot animation using 2D animation production software and image synthesis software, and rendering dynamic images with the cyclic sequential frames; and
   producing a stereo boot animation video for the stereo boot animation using 3D animation production software and image synthesis software, and rendering dynamic images with the cyclic sequential frames.

4. The method for realizing a boot animation of a virtual reality system according to claim 3, wherein the performing screenshots for the sequential frames of left-right double screen effect on a per frame basis specifically comprises:
   saving the sequential frames of left-right double screen effect into a file;
   installing the file to a handheld device or a PC end; and
   sending a screenshot command to the handheld device or the PC end so that the file is played thereby, and performing screenshots for the sequential frames of left-right double screen effect in the file on a per frame basis.

5. An apparatus for realizing a boot animation of a virtual reality system, comprising a processor, which is configured to:
   acquire cyclic sequential frames of a boot animation from the virtual reality system, wherein the boot animation includes a planar boot animation and a stereo boot animation;
   process the cyclic sequential frames into sequential frames of left-right double screen effect for displaying a planar boot animation video and a stereo boot animation video on a display;
   saving sequential frames of left-right double screen effect in the planar boot animation and the stereo boot animation respectively to a first file and a second file;
   perform screenshots for the sequential frames of left-right double screen effect on a per frame basis while playing the first file and the second file to obtain the screenshot of each frame of image of the sequential frames of left-right double screen effect; and
   replace an original boot animation in the virtual reality system with the screenshots of the frames of image as a current boot animation, so as to realize the boot animation of the virtual reality system.

6. The apparatus for realizing a boot animation of a virtual reality system according to claim 5, wherein the processor is further configured to:
   before replacing the original boot animation in the virtual reality system with the screenshots of the frames of image, optimize the screenshot of each frame of image and compress a volume of the screenshot, while ensuring a predetermined visual effect.

7. The apparatus for realizing a boot animation of a virtual reality system according to claim 6, wherein the processor is further configured to:
   produce a planar boot animation video for the planar boot animation using 2D animation production software and image synthesis software, and render dynamic images with the cyclic sequential frames; and
   produce a stereo boot animation video for the stereo boot animation using 3D animation production software and image synthesis software, and render dynamic images with the cyclic sequential frames.

8. The apparatus for realizing a boot animation of a virtual reality system according to claim 7, wherein the processor is further configured to:
   save the sequential frames of left-right double screen effect into a file; install the file to a handheld device or a PC end; and send a screenshot command to the handheld device or the PC end so that the file is played thereby, and perform a screen shot for the sequential frames of left-right double screen effect in the file on a per frame basis.

* * * * *